(12) United States Patent
Modani et al.

(10) Patent No.: US 10,628,474 B2
(45) Date of Patent: Apr. 21, 2020

(54) PROBABALISTIC GENERATION OF DIVERSE SUMMARIES

(71) Applicant: ADOBE INC., San Jose, CA (US)

(72) Inventors: Natwar Modani, Bengaluru (IN); Jonas Dahl, Basel (CH); Harsh Jhamtani, Kanpur (IN); Balaji Vasan Srinivasan, Bangalore (IN)

(73) Assignee: ADOBE INC., San Jose, CA (US)

( * ) Notice: Subject to any disclaimer, the term of this patent is extended or adjusted under 35 U.S.C. 154(b) by 519 days.

(21) Appl. No.: 15/203,056

(22) Filed: Jul. 6, 2016

(65) Prior Publication Data
US 2018/0011931 A1   Jan. 11, 2018

(51) Int. Cl.
G06F 16/34 (2019.01)
G06F 17/27 (2006.01)

(52) U.S. Cl.
CPC .......... *G06F 16/345* (2019.01); *G06F 17/271* (2013.01); *G06F 17/2785* (2013.01)

(58) Field of Classification Search
CPC ............. G06F 17/279; G06F 17/30719; G06F 17/30905; G06F 16/345
See application file for complete search history.

(56) References Cited

U.S. PATENT DOCUMENTS

| | | | | |
|---|---|---|---|---|
| 5,924,108 A * | 7/1999 | Fein | ..................... | G06F 17/2715 707/E17.094 |
| 7,117,437 B2 * | 10/2006 | Chen | ............................ | 715/254 |
| 7,292,972 B2 * | 11/2007 | Lin | .......................... | G06F 17/27 704/1 |
| 7,310,633 B1 * | 12/2007 | Wang | ................. | G06F 17/30696 707/742 |
| 7,376,893 B2 * | 5/2008 | Chen | .................... | G06F 17/2775 715/254 |
| 7,451,395 B2 * | 11/2008 | Brants | ................. | G06F 17/2229 715/254 |
| 7,725,442 B2 * | 5/2010 | Lin | ........................ | G06F 16/345 707/688 |

(Continued)

OTHER PUBLICATIONS

Socher, Richard, et al. "Dynamic pooling and unfolding recursive autoencoders for paraphrase detection." Advances in Neural Information Processing Systems. 2011.

(Continued)

*Primary Examiner* — Kavita Padmanabhan
*Assistant Examiner* — Tyler Schallhorn
(74) *Attorney, Agent, or Firm* — Shook, Hardy and Bacon L.L.P.

(57) ABSTRACT

A method for generating summaries includes selecting a first subset of text units of a text composition to incorporate into a first summary of the text composition using a weighting of the text units that indicates for each text unit a relative importance of including the text unit in summaries of the text composition. The weighting of the text units is modified to reduce the relative importance of each text unit in the first subset based on the text unit having been selected for the first subset. A second subset of the text units is selected to incorporate into a second summary of the text composition using the modified weighting of the text units. At least one of the first summary and the second summary are provided to a user device.

20 Claims, 7 Drawing Sheets

(56) References Cited

U.S. PATENT DOCUMENTS

| | | | | |
|---|---|---|---|---|
| 7,882,450 | B2* | 2/2011 | Bornstein | G06F 17/211 715/802 |
| 7,921,092 | B2* | 4/2011 | Anick | G06F 17/30696 707/705 |
| 9,116,984 | B2* | 8/2015 | Caldwell | G06F 17/30719 |
| 9,916,375 | B2* | 3/2018 | Bhagwat | G06F 16/345 |
| 10,042,924 | B2* | 8/2018 | Billawal | G06F 17/30719 |
| 10,169,453 | B2* | 1/2019 | Luo | G06F 16/345 |
| 2003/0110297 | A1* | 6/2003 | Tabatabai | G06F 17/30905 709/246 |
| 2003/0130837 | A1* | 7/2003 | Batchilo | G06F 17/2715 704/9 |
| 2004/0117725 | A1* | 6/2004 | Chen | G06F 17/2775 715/254 |
| 2004/0117740 | A1* | 6/2004 | Chen | 715/210 |
| 2004/0122657 | A1* | 6/2004 | Brants | G06F 17/2229 704/9 |
| 2006/0206806 | A1* | 9/2006 | Han | G06F 17/30719 715/236 |
| 2006/0265666 | A1* | 11/2006 | Bornstein | G06F 17/211 715/802 |
| 2008/0133482 | A1* | 6/2008 | Anick | G06F 17/30696 |
| 2008/0189074 | A1* | 8/2008 | Lin | G06F 16/345 702/181 |
| 2011/0314041 | A1* | 12/2011 | Drucker | G06Q 30/02 707/769 |
| 2012/0278300 | A1* | 11/2012 | Soubbotin | G06F 17/30696 707/706 |
| 2013/0006973 | A1* | 1/2013 | Caldwell | G06F 17/30719 707/723 |
| 2014/0046960 | A1* | 2/2014 | Drucker | G06Q 30/02 707/748 |
| 2015/0302083 | A1* | 10/2015 | Simske | G06F 17/279 707/750 |
| 2016/0048511 | A1* | 2/2016 | Bhagwat | G06F 17/30719 707/755 |
| 2016/0335234 | A1* | 11/2016 | Baker | G06F 17/2705 |
| 2016/0350412 | A1* | 12/2016 | Donato | G06F 17/30719 |
| 2017/0228457 | A1* | 8/2017 | Billawal | G06F 17/30719 |
| 2017/0277668 | A1* | 9/2017 | Luo | G06F 17/30719 |

OTHER PUBLICATIONS

Kågebäck, Mikael, et al. "Extractive summarization using continuous vector space models." Proceedings of the 2nd Workshop on Continuous Vector Space Models and their Compositionality (CVSC)@ EACL. 2014.

Lin, Hui, and Jeff Bilmes. "A class of submodular functions for document summarization." Proceedings of the 49th Annual Meeting of the Association for Computational Linguistics: Human Language Technologies—vol. 1. Association for Computational Linguistics, 2011.

Gupta, Anand, et al. "Text summarization through entailment-based minimum vertex cover." Lexical and Computational Semantics (* SEM 2014) (2014): 75.

Mei, Q.; Guo, J.; and Radev, D. 2010. Divrank: the interplay of prestige and diversity in information networks. In Proceedings of the 16th ACM SIGKDD international conference on Knowledge discovery and data mining, 1009-1018. ACM.

Tong, H., He, J., Wen, Z., Konuru, R., Lin, C.Y.: Diversified ranking on large graphs: an optimization viewpoint. In: KDD. vol. 11, pp. 1028-1036 (2011).

Günes Erkan and Dragomir R. Radev. 2004. LexRank: graph-based lexical centrality as salience in text summarization. J. Artif. Int. Res. 22,1 (Dec. 2004), 457-479.

Jaime Carbonell and Jade Goldstein. 1998. The use of MMR, diversity-based reranking for reordering documents and producing summaries. In Proceedings of the 21st annual international ACM SIGIR conference on Research and development in information retrieval (SIGIR '98). ACM, New York, NY, USA, 335-336.

Ani Nenkova and Kathleen McKeown (2011), "Automatic Summarization", Foundations and Trends® in Information Retrieval: vol. 5: No. 2-3, pp. 103-233.

* cited by examiner

Input to be summarized

○ 264a Read from this file  [266 Browse]

● 264b From the text box

Number of Summaries [3] — 270

Desired Size of each Summary [100] Words — 272

262 — 
We build creative solutions for sustainable business. We find new ways to conserve natural resources in everything we do and we've seen big benefits for our business, our customers, our people, and our communities.

Managing business to benefit earth. Before we buy, build, or use, we ask, is it sustainable? By sourcing our materials with care, monitoring our energy usage and carbon emissions, and creating environmentally friendly data centers and office building, we reduce our impact on the planet and enhance our bottom line. See how we conserve energy.

Helping customers support sustainability. Our move to cloud-based products and electronic document services has reduced post-consumer waste as well as carbon emissions from product transport. So our customers can do amazing things with their Adobe software while doing good for their planet. Explore our waste reduction programs. See our sustainable product innovations.

Great workspaces inspire great work. That's why more than 70% of our employees work in LEED-certified buildings, with clean air, natural light, and creative design. And with perks like edible gardens and on-site farmers markets, we're seeing a boost in wellness, productivity, and job satisfaction. See how we build green.

A culture of conservation. Our people are passionate about sustainability. That's why we sponsor Adobe Green Teams so employees can take meaningful environmental action at work, in local communities, and at home. Learn about our Green Teams.

242 Join us on our journey to create change. Explore our stories.

Corporate Responsibility Reports Download the most recent report See all reports
Adobe Foundation Board Corporate Governance Sustainability Policy
Read our blog News & Awards Supply Chain
Integrity @ Adobe Security Diversity In 2014, Newsweek recognized Adobe as the greenest technology company in the world. This year, Adobe was named to The Global 100 Most Sustainable Corporations in the Worldindex for the first time. But it goes beyond the business it's about fostering a culture of sustainability. Watch the video.

Output — 200B

Summary 1

We build creative solutions for sustainable business. Managing business to benefit earth. Before we buy, build, or use, we ask, is it sustainable? See how we conserve energy helping customers support sustainability. So our customers can do amazing things with their Adobe software while doing good for their planet. And with perks like edible gardens and on-site farmers markets, we're seeing a boost in wellness, productivity, and job satisfaction. See how we build green. A culture of conservation. Our people are passionate about sustainability. But it goes beyond the business it's about fostering a culture of sustainability. Watch the video.

240a

Summary 2

We find new ways to conserve natural resources in everything we do and we've seen big benefits for our business, our customers, our people, and our communities. Before we buy, build, or use, we ask, is it sustainable? Explore our waste reduction programs. See our sustainable product innovations. Great workspaces inspire great work. And with perks like edible gardens and on-site farmers markets, we're seeing a boost in wellness, productivity, and job satisfaction. See how we build green. A culture of conservation. But it goes beyond the business it's about fostering a culture of sustainability. Watch the video.

240b

Summary 3

Before we buy, build, or use, we ask, is it sustainable? Our move to cloud-based products and electronic document services has reduced post-consumer waste as well as carbon emissions from product transport. So our customers can do amazing things with their Adobe software while doing good for their planet. Explore our waste reduction programs. See our sustainable product innovations. Great workspaces inspire great work. That's why more than 70% of our employees work in LEED-certified buildings, with clean air, natural light, and creative design. But it goes beyond the business it's about fostering a culture of sustainability. Watch the video.

PROBABALISTIC GENERATION OF DIVERSE SUMMARIES

BACKGROUND

Digital content management systems allow content authors to create different variants, or versions, of the same content. Content authors can assign different variants of the content to different computing contexts so that when a device requests the content, the appropriate version is automatically selected for transmission to the device (e.g., on a web site). This allows content authors to tailor content to users or devices while being compatible with computer transmission infrastructure. For example, a shorter version of content is often suitable for mobile devices, which typically have small displays that fit less information than desktop displays and are typically more difficult to read.

Digital content management systems, such as Adobe® Experience Manager, allow users to maintain master content (e.g., a text composition) that a user can use as a common starting point to generate many variants (e.g., summaries or other variations to the master content). It may be desirable for a user to leverage computer summarization technology in order to automatically generate different summaries that are diverse from one another in content so they can be used for different variants or provide options to the user. Conventional extractive summarization generates a summary by selecting a subset of the words, phrases, or sentences in an original composition to form the summary Conventional extractive summarization generates a single summary that includes the subsets that are most representative of the original composition, while maintaining the most diversity in content within the summary. Thus, multiple summaries of content generated using conventional extractive summarization are substantially similar to one another.

SUMMARY

This summary is provided to introduce a selection of concepts in a simplified form that are further described below in the Detailed Description.

The present application provides a technology that can be used to generate summaries of master content for variant content. In some respects, to generate a first summary of a text composition, the text composition is divided into text units, such as sentences. A subset of the text units is selected for inclusion in the first summary based on importance scores from an importance metric that are used to evaluate the importance of including particular text units in the first summary. To generate a second summary of the text composition, the weighting of the importance scores of text units selected for the first summary is modified to reduce the probability that the text units are selected for inclusion in the second summary Thus, the first and second summaries are likely to be diverse from one another. Any number of summaries can be generated and the weighting of each text unit may be adjusted each time a summary includes the text unit.

In further respects, to generate a summary of a text composition, the text units are probabilistically selected for inclusion in the summary In one iterative approach to selecting text units, the importance scores of the text units are converted into a probability distribution. In each iteration, a value is sampled from the probability distribution and a text unit corresponding to the sampled value is selected to include in the summary. The probability distribution is updated to reduce the probability that text units similar to the selected text unit are selected in subsequent iterations to include in the summary Probabilistically selecting text units to generate multiple summaries results in summaries that are likely to be diverse from one another. These and other concepts are contemplated as being within the scope of the present disclosure.

BRIEF DESCRIPTION OF THE DRAWINGS

The present invention is described in detail below with reference to the attached drawing figures, wherein:

FIG. 2A shows an example of a user interface that can be used to provide a request to generate summaries of a text composition in accordance with embodiments of the present disclosure;

FIG. 2B shows an example of a display of summaries provided to a user device in response to a request to generate summaries of a text composition in accordance with embodiments of the present disclosure;

DETAILED DESCRIPTION

Figure 1:
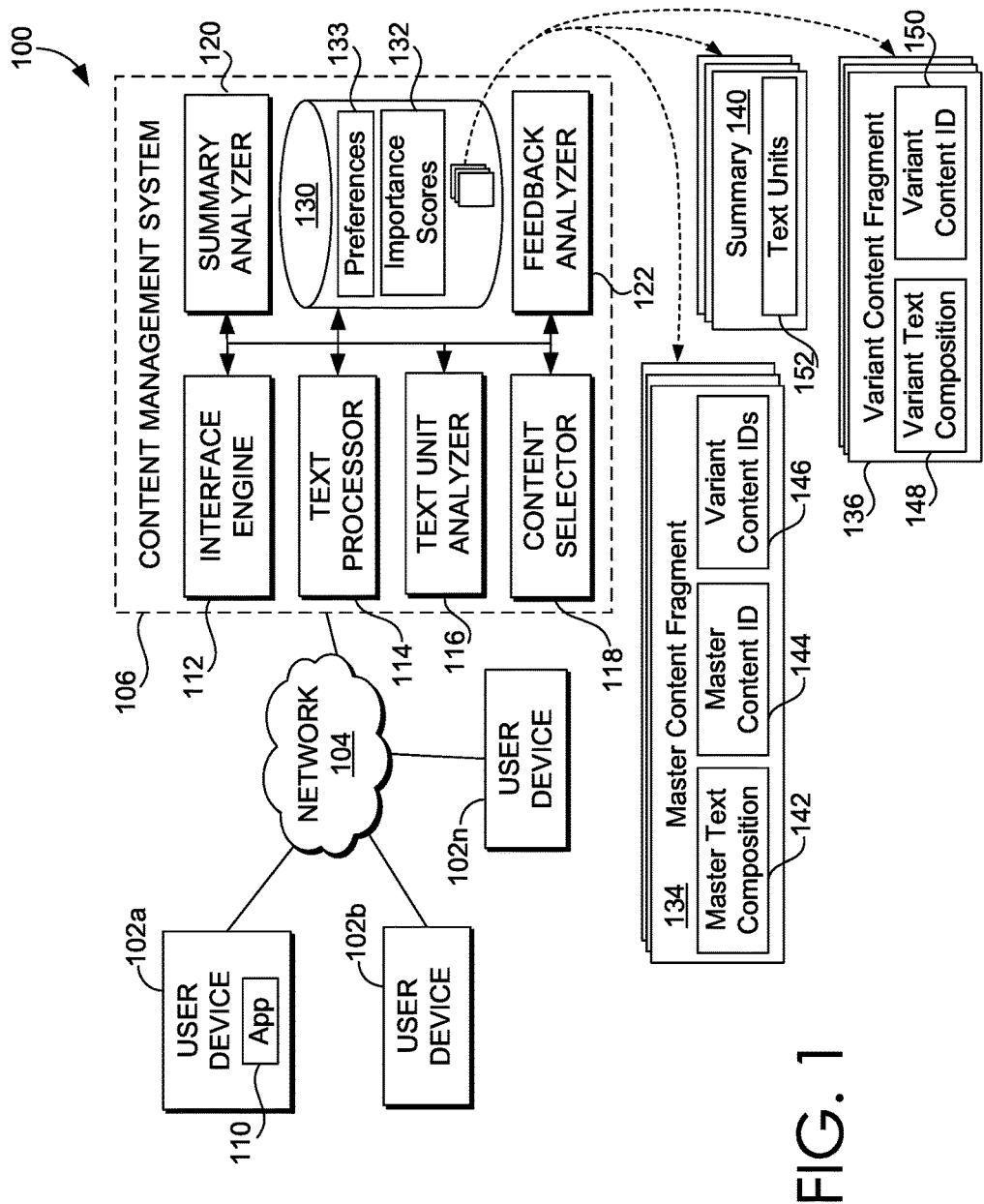
FIG. 1 shows a block diagram showing an example of an operating environment in accordance with embodiments of the present disclosure.

The subject matter of the present invention is described with specificity herein to meet statutory requirements. However, the description itself is not intended to limit the scope of this patent. Moreover, although the terms "step" and/or "block" may be used herein to connote different elements of methods employed, the terms should not be interpreted as implying any particular order among or between various steps herein disclosed unless and except when the order of individual steps is explicitly described.

The present application provides a technology that can be used to generate summaries of master content for variant content. Digital content management systems, such as Adobe® Experience Manager, allow users to maintain master content (e.g., a text composition) that a user can use as a common starting point to generate many variants (e.g., summaries or other variations to the master content). It may be desirable for a user to leverage computer summarization technology in order to automatically generate different summaries that are diverse from one another in content so they can be used for different variants or provide options to the user.

Conventional extractive summarization generates a summary by selecting a subset of the words, phrases, or sentences in an original composition to form the summary Conventional extractive summarization generates a single summary that includes the subsets that are most representative of the original composition, while maintaining the most diversity in content within the summary One could generate multiple summaries independently using conventional extractive summarization technology. However, these summaries would be substantially similar to one another. Thus, the summaries would not be suitable for different variants and would not provide the user with options. Aspects of the present disclosure provide improvements to computer summarization technology, such as extractive summarization technology, which allows multiple summaries to be produced that are likely to be diverse from one another.

In some respects, to generate a first summary of a text composition, the text composition is divided into text units, such as sentences. A subset of the text units is selected for inclusion in the first summary based on importance scores from an importance metric that are used to evaluate the importance of including particular text units in the first summary. To generate a second summary of the text composition, the weighting of the importance scores of text units selected for the first summary is modified to reduce the probability that the text units are selected for inclusion in the second summary.

In one approach, the weighting is modified for a text unit by reducing its corresponding importance score by a damping factor and selecting text units for the second summary using the reduced importance score. Thus, the first and second summaries are likely to be diverse from one another. Any number of summaries can be generated and the weighting of each text unit may be adjusted each time a summary includes the text unit. For example, a text unit that is selected for two summaries may have its importance score reduced more than a text unit that is selected for only one summary. As, the text units in the first summary are not explicitly barred from being included in subsequent summaries, the subsequent summaries can be of higher quality by including sufficiently important text units despite their modified weightings.

In further respects, to generate a summary of a text composition, the text units are probabilistically selected for inclusion in the summary In one iterative approach to selecting text units, the importance scores of the text units are converted into a probability distribution. In each iteration, a value is sampled from the probability distribution and a text unit corresponding to the sampled value is selected to include in the summary. The probability distribution is updated to reduce the probability that text units similar to the selected text unit are selected in subsequent iterations to include in the summary Probabilistically selecting text units to generate multiple summaries results in summaries that are likely to be diverse from one another.

Implementations that modify the weighting of importance scores of text units selected for a first summary to reduce the probability that the text units are selected for a second summary can probabilistically select the text units to include in each summary Where a probability distribution is used to generate each summary, the probability distribution can be updated to modify the weighting of the importance scores. This can include reducing the importance scores and converting the importance scores into a new probability distribution used to select text units for a summary. As another example, the probability distribution used to select text units for one summary can be adjusted to modify the weighting of the text units. The modified probability distribution can be used to select text units for another summary.

Additional aspects of the disclosure provide for evaluating summaries of a text composition and ranking the summaries based on the evaluation. To evaluate the summaries, the text of each summary may be analyzed with respect to predefined criteria to generate an evaluation score. Examples of the criteria for a summary includes how well the summary conforms to at least one writing style, such as a business style, a conversational style, a particular style of sentence structure, a use of clichés, a use of tense, a level of sophistication, a style directed to a particular audience, or demographic, and more. The ranking of the summaries can be used in various ways, such as to determine how to present the summaries to a user (e.g., the order the presented summaries), which summaries to present to the user, and/or which summaries to transmit to a user device (e.g., summaries that fail to satisfy a threshold evaluation score may not be transmitted to the user device).

In some cases, the user can interact with the summaries of a text composition. This can include modifying the text of at least one summary and/or selecting at least one summary to use as a variant of master content, or for another purpose. The user interactions can provide feedback that is updates weightings of machine learning models that correspond to any of various criteria of summaries. The machine learning models can be used to weight the criteria in evaluation scores, in the importance metric, and/or in the reduction to the weightings of importance scores.

Unlike in conventional systems, using approaches described herein, users are able to quickly and accurately generate summaries of text compositions that are of high quality and diverse from one another in content. This allows the summaries to be used for different variants or provide options to the users on which to use. A user can, for example, select which summary suits the user's needs, which may be difficult to quantify when generating any particular summary.

Furthermore, approaches described herein may incorporate any standard summarization algorithm that returns a score indicating the importance of text units in a summary (i.e., an importance score). The importance scores for text units can be adjusted, allowing at least one summary to be biased towards a particular topic or other quantifiable objective. The quantifiable objectives can be particular to the user and may be machine learned based on historic interactions of the user with generated summaries. Thus, the summaries that are generated are more likely to satisfy user objectives.

Furthermore, multiple summaries of a text composition would conventionally be produced independently. The present disclosure allows computer processing and storage to be preserved because the corresponding data can be leveraged for multiple summaries. As one example, data used to track and identify the text units of a text composition can be used to generate each summary of the text composition. As another example, in implementations that employ a probability distribution, the same initial probability distribution can be utilized to generate each summary of a text composition.

Furthermore, in implementations where the weighting of the importance scores of text units selected for one summary is modified to reduce the probability that the text units are selected for inclusion in the second summary, the storage and processing require to generate multiple summaries can be significantly reduced. For example, the initial importance scores and/or probability distribution can be calculated, stored, and used to select text units for each summary. The weighting of text units may be adjusted for each summary by applying a damping factor to the initial data.

Turning now to FIG. 1, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102a and 102b through 102n, network 104, and content management system 106. Content management system 106 includes interface engine 112, text processor 114, text unit analyzer 116, content selector 118, summary analyzer 120, feedback analyzer 122, and storage 130.

It should be understood that operating environment 100 shown in FIG. 1 is an example of one suitable operating environment. Each of the components shown in FIG. 1 may be implemented via any type of computing device, such as one or more of computing device 600, described in connection to FIG. 6, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and data sources may be employed within operating environment 100 within the scope of the present disclosure. Each may comprise a single device or multiple devices cooperating in a distributed environment. For instance, content management system 106 may be provided via multiple devices arranged in a distributed environment that collectively provide the functionality described herein. Additionally, other components not shown may also be included within the distributed environment. In some cases, functionality of content management system 106 can be integrated, at least partially, into a user device, such as user device 102a. Furthermore, content management system 106 may at least partially be a cloud computing service.

User devices 102a through 102n can be client devices on a client-side of operating environment 100, while content management system 106 can be on a server-side of operating environment 100. Content management system 106 can comprise server-side software designed to work in conjunction with client-side software on user devices 102a through 102n so as to implement any combination of the features and functionalities discussed in the present disclosure. An example of such client-side software is application 110 on user device 102a. Each other device shown may include a similar application, with similar functionality. This division of operating environment 100 is provided to illustrate one example of a suitable environment, and it is noted there is no requirement for each implementation that any combination of content management system 106 and user devices 102a through 102n to remain as separate entities.

User devices 102a through 102n comprise any type of computing device capable of being operated by a user. In some implementations, user devices 102a through 102n are the type of computing devices described in relation to FIG. 6 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices include one or more processors, and one or more computer-readable media. The computer-readable media includes computer-readable instructions executable by the one or more processors. The instructions may implement one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of providing requests to generate summaries of text compositions to content management system 106, as will later be described in additional detail. It is contemplated herein that "application" be interpreted broadly. As one example, an application can be installed on an operating system of a user device. As another example, an application can be a service integrated into an operating system of a user device. In various implementations, an application can be on a user device, as shown with respect to application 110, but can at least partially be hosted server-side (e.g., on content management system 106). In some cases, application 110 comprises a web browser interfacing content management system 106 via a web site.

Content management system 106 includes one or more processors, and one or more computer-readable media. The computer-readable media includes computer-readable instructions executable by the one or more processors. The instructions may implement one or more of interface engine 112, text processor 114, text unit analyzer 116, content selector 118, summary analyzer 120, and feedback analyzer 122 shown in FIG. 1.

Storage 130 can comprise the computer-readable media and is configured to store computer instructions (e.g., software program instructions, routines, or services), data, and/or models used in embodiments described herein. In some implementations, storage 130 stores information or data received via the various components of content management system 106 and provides the various components with access to that information or data, as needed. In implementations, storage 130 comprises a data store (or computer data memory). Although depicted as a single component, storage 130 may be embodied as one or more data stores and may be in the cloud. Further, the information in storage 130 may be distributed in any suitable manner across one or more data stores for storage (which may be hosted externally).

Interface engine 112 is configured to interface content management system 106 with user devices, such as user devices 102a and 102b through 102n, for example, over network 104. Interface engine 112 can receive one or more network communications from user devices (e.g., from application 110), and provide one or more network communications to the user devices (e.g., to application 110). Interface engine 112 can communicate with one or more user devices, as needed, to carry out various implementations of the present disclosure.

In some implementations, a user is able to interact with content management system 106, for example, using a user interface of application 110, in order to provide one or more master text compositions to content management system 106. As shown, content management system 106 includes many master text compositions in storage 130, such as master text composition 142. A user can also interact with content management system 106, for example, using the user interface of application 110, in order to provide one or more variant text compositions to content management system 106. As shown, content management system 106 includes many variant text compositions in storage 130, such as variant text composition 148.

As used herein, a text composition includes computer text organized in a prearranged manner. As one example, the user may provide a text composition to interface engine 112 as a complete composition. As another example, the user may compose the text composition over interface engine 112, such as using a word processing application. Further, a user may be permitted to use a word processing application to modify an existing text composition.

As used herein, a master content fragment refers to a data object that represents a master text composition. As shown, each master text composition may be assigned to a master content fragment. For example, master text composition 142 is assigned to master content fragment 134. In some cases, the user may indicate that a preexisting text composition (e.g., previously constructed and persistently stored) is a master text composition, causing the text composition to be assigned to a master content fragment. In other cases, the master text composition is initially constructed and persistently stored as a master content fragment.

As shown, a master content fragment typically includes a single master text composition. A master content fragment can also include a master content identifier (ID), such as master content ID 144. The master content ID (e.g., a universally unique identifier UUID) identifies the master content fragment with respect to other master content fragments within content management system 106.

Content management system 106 can assign any number of variant text compositions to a master text composition. Each variant text composition is typically generated from the master text composition to which it is assigned. For example, in some implementations, content management system 106 receives a request from a user (e.g., via application 110) to create a new variant text composition from a master text composition specified by the request (e.g., by master content ID). In response, content management system 106 can optionally provide the user with the master text composition (e.g., via application 110). The master text composition may be displayed on the user device where the user can change the text thereof and save the modified text as a variant text composition of the master text composition.

As another example, content management system 106 may automatically modify a master text composition to create one or more variant text compositions (e.g., using text modification algorithms) Examples of modifications that may be made automatically and/or by a user include summarization, truncation, reordering of sentences, and linguistic adaptation. Examples of linguistic adaptation includes customizing words to a particular audience, such as based on their demographic information (e.g., age, location, etc.), to spoken language (e.g., "cookie" in American English changed to "biscuit" in British English), and the like.

Assigning a variant text composition to a master text composition may optionally include assigning a variant content ID to the master content fragment corresponding to the master text composition. A variant content ID (e.g., a universally unique identifier UUID) identifies a variant text composition with respect to other variant text compositions within content management system 106. In some implementations, variant text compositions are represented similar to master content fragments. In particular, each variant content fragment can correspond to a respective variant text composition with a respective variant content ID. For example, variant content fragment 136 represents variant text composition 148 and has variant content ID 150.

It will be appreciated that other configurations are possible to internally represent master and variant text compositions, as well as to associate variant text compositions with master text compositions. In some cases, variant text compositions (e.g., variant content fragments) are embedded within assigned master content fragments. In others, variant text composition are stored and maintained separately from assigned master text compositions.

Master text compositions may have any number of associated variant text compositions. Users of user devices 102a and 102b through 102n can optionally assign different versions, or variants, of the content to different computing contexts so that when a device requests the content, the appropriate version is automatically selected for transmission to the device (e.g., on a web site). For example, content management system 106 can receive the assignments from the user (e.g., via application 110). Content management system 106 optionally includes content selector 118. When content management system 106 receives a request for particular content (e.g., a master content ID or more generic content ID), such as via interface engine 112, content selector 118 is configured to identify the computing context associated with the request, match the computing context to one of the variant text compositions (or the master text composition) associated with the content ID, and provide the selected text composition for display on the user device (e.g., in an application, on a web page, in an operating system, in an email, in a push notification). Examples of computing context includes any combination of user attributes and device attributes, such as user demographic information, location information, browser information or type, hardware information or type (e.g., a hardware profile), and more.

A content author may wish to make a summary of a text composition, such as a master text composition. To do so, a user may interact with interface engine 112 (e.g., via application 110) and provide a request to generate summaries of the text composition. FIG. 2A shows an example of a user interface that can be used to provide a request to generate summaries of a text composition. In particular, FIG. 2A shows user interface 200A which a user can utilize to specify in the request which text composition content management system 106 will generate summaries from. User interface 200A can be displayed, for example, by application 110 on user device 102a.

User interface 200A can facilitate one or more options for the user to specify the text composition in the request. In user interface 200A, options 264a and 264b are shown. In some cases, the user can select from the one or more options using user interface (UI) elements of user interface 200A. As shown, options 264*a* and 264*b* have respective radio buttons a user may use to select the corresponding option. In other cases, selection may be implicit, for example, based on the user providing information sufficient to specify the text composition using the option.

As an example, option 264*a* corresponds to the user specifying a data object comprising the text composition. The data object can be, for example, a file, such as a text document or other type of file. As another example, the data object can be a master content fragment (e.g., master content fragment 134). In some cases, the user can optionally browse to the data object and select the data object (e.g., from a plurality of data objects) to automatically enter the data object path into data object path field 266. Where the data object path is provided by the user, the option could be implicitly selected. The data object can be located on content management system 106, such as in storage 130, on a user device, such as user device 102*a*, or elsewhere.

As another example, option 264*b* corresponds to the user entering the text composition into text box 262. For example, the user can type or paste the text composition into text box 262, which may support word processing capabilities. Where the user has entered the text composition into text box 262, the option could be implicitly selected. In the example shown, text composition 242 has been entered into text box 262. Text composition 242 corresponds to master text composition 142 of FIG. 1, as one example.

Options 264*a* and 264*b* are two examples of a user specifying the text composition; however, many different types of interfaces are contemplated as being compatible with implementations of the present disclosure. In addition to specifying the text composition, the user may optionally specify one or more summarization preferences in the request. The summarization preferences, when present, are utilized by content management system 106 when generating the summaries. Preferences 133 in FIG. 1 can comprise stored values representing the summarization preferences specified by the user.

FIG. 2A shows two summarization preferences specified by the user. Summarization preference 270 specifies the number of summaries of the text composition for content management system 106 to generate and/or provide to the user in response to the request. Summarization preference 272 specifies a desired size for each summary. As will later be discussed in additional detail, content management system 106 can utilize the desired size to determine the length of the generated summaries. For example, the desired size can be used as a budget, or cap on the length of each summary Although FIG. 2A shows a user specifying a number of words, the desired size can be specified utilizing any suitable unit, such as a number of text units, sentences, characters, spaces, and the like.

In some cases, the user submits the request (e.g., using a UI element such as a submit button) after having specified the text composition and optionally one or more summarization preferences. The request could include a pointer to the text composition, such as where the text composition is located on content management system 106. As another example, the request can include the text itself of the text composition, such as where the text composition was not originally present on content management system 106. The request may be transmitted from the user device (e.g., via application 110) to content management system 106.

In various implementations, content management system 106 is configured to generate summaries of a text composition in response to a request to generate the summaries. The request can be, for example, from a user, such as the request described above. In will be appreciated that in some cases, the request can be from an application or service (e.g., application 110) without being made by the user. To this effect, content management system 106 includes text processor 114, text unit analyzer 116, content selector 118, summary analyzer 120, and feedback analyzer 122.

As an overview, text processor 114 divides the text of a text composition into text units, such as sentences. Text unit analyzer 116 evaluates the relative importance of including each text unit in a summary of the text composition using an importance metric that outputs importance scores, such as importance scores 132, of the text units. Content selector 118 selects text units of the text composition to include in the summaries based on the importance scores. Summary analyzer 120 evaluates generated summaries with respect to one or more criteria to determine how to provide the summaries to the user and/or which summaries to provide to the user. Feedback analyzer 122 analyzes user feedback on the summaries that are provided to the user and based on the analysis can update one or more machine learning models used by summary analyzer 120 to evaluate summaries, content selector 118 to select text units, and/or text unit analyzer 116 to determine the relative importance of text units.

As mentioned above, text processor 114 is configured to divide the text composition into text units. Text processor 114 can optionally determine the text units in response to the request to generate the summaries or the text units may already be determined and identified prior to the request. Determining the text units can include storing the text units such that they are individually identifiable and usable by content selector 118, such as using a text unit identifier for each text unit along with an associated text snippet and/or pointer(s) to text of the text composition. As used herein, a text unit refers to one or more characters grouped together using a predetermined grouping algorithm. For a particular text composition, each text unit is typically generated using the same predetermined grouping algorithm.

Determining text units of a text composition can include identifying delimiters (e.g., predefined punctuation) between text corresponding to the text units in the text composition and parsing the text composition into the text units based on the identified delimiters. Any suitable text segmentation algorithms can be employed, such as word segmentation, sentence segmentation, and topic segmentation. In various implementations, each text unit corresponds to a respective sentence of a text composition, such as a sentence segment. Text processor 114 uses the grouping algorithm (e.g., text segmentation algorithm) to parse each text composition into the text units. The text units determined for a single text composition are typically non-overlapping of one another and may cover each word and/or character of the text composition. Any suitable parsing algorithm can be employed to tokenize a text composition into the text units. In will be appreciated that at any point the text from the text composition may be modified, such as to correct spelling and/or grammar errors in the text. However, typically when such modification is performed the concepts, topics, or meaning entities of the text are unchanged.

Text processor 114 provides the text units of the text composition to text unit analyzer 116. Text unit analyzer 116 evaluates the text units with respect to an importance metric. The importance metric quantifies the relative importance of including each text unit in a summary. The relative importance for each text unit can be represented by an importance score that is output by the importance metric. Thus, text unit analyzer 116 can generate importance scores of the text units of the text composition, where the importance scores correspond to the importance metric. Any suitable importance metric can be employed. One suitable importance metric is based on Maximal Marginal Relevance (MMR).

In some cases, the importance metric quantifies for each text unit a level of representativeness of one or more concepts of the text unit with respect to the text composition overall. Various approaches to concept or meaning entity or topic mining and extraction from text are known, any of which may be employed. An importance score for a text unit can be based on how representative the text unit is of the one or more concepts, topics, or meaning entities of the text composition. As one example, key words known to correspond to concepts or topics could be identified from the text unit, and the importance score could be based on the number and/or weighting of those identified key words (e.g., relative to the number and/or weighting of key words identified in the text composition overall). The importance score of a text unit can increase with its level of representativeness of a text composition. In some cases, the importance score of a text unit corresponds to or is based on a number of meaning entities detected in the text unit. For example, the importance score can be based on the number of meaning entities detected in the text unit relative to the number of meaning entities detected in the text composition overall.

The importance metric can also quantify for each text unit a level of diversity of one or more concepts of the text unit with respect to concepts of other text units. In some cases, the importance score of a text unit can increase with the level of diversity, such as the uniqueness of the one or more concepts it covers compared to the concepts covered by other text units (e.g., the text units overall or a subset of the text units). The importance metric can quantify the level of diversity of one or more concepts of the text unit with respect to concepts of text units already selected to incorporate into the first summary. For example, text units can have their importance score discounted based on covering concepts similar to one or more concepts already included in a summary Basing the importance scores on diversity, text units that cover more novel concepts tend to have higher importance scores than their less novel counterparts.

Content selector 118 determines which text units to include in the summary based on the importance scores generated by text unit analyzer 116. In some cases, content selector 118 employs an iterative selection process for the text units. In the iterative selection process, content selector 118 selects at least one text unit (e.g., a single text unit each iteration) to include in the summary based on the importance scores. Text unit analyzer 116 updates the importance scores based on the selected at least one text unit. In a subsequent iteration, content selector 118 selects at least one of the remaining text units to include in the summary based on the updated importance scores. In some cases, a budget dictates the summary Each selected text unit can have an associated cost that is applied to the budget. Content selector 118 can reduce the budget by the cost of any selected text units. This repeats until content selector 118 has selected each text unit to include in the summary, such as when there are no remaining text units or each of the remaining text units would exceed the remaining budget.

In some implementations, content selector 118 selects a text unit to include in the summary based on the text unit having the highest importance score of the remaining text units that have not been selected to include in the summary. This or other deterministic selection of one or more text units can be utilized.

In some cases, rather than deterministic selection, content selector 118 probabilistically selects each text for incorporating into the summary based on the importance scores. Using the probabilistic selection of text units, text unit analyzer 116 can determine a probability of selecting each remaining text unit that is based on the importance score of the text unit. Thus, the higher the importance score of a text unit, the higher the probability that content selector 118 selects the text unit to include in the summary.

In some implementations, content selector 118 performs probabilistic selection by sampling a value from a probability distribution that text unit analyzer 116 generates from the importance scores. Each value that is sampled can correspond to a text unit and the text unit corresponding to the sampled value can be incorporated into the summary In some cases, each outcome of the probability distribution corresponds to incorporation of a designated text unit into the summary. The probability distribution can be based on the importance scores of the text units. For example, text unit analyzer 116 can convert the importance scores into the probability distribution. Where the importance scores are all positive, this can include text unit analyzer 116 summing all of the importance scores and determining the probability of selecting each text unit by dividing the importance score by the sum of the importance scores. This approach results in normalized probabilities than can easily be utilized for the probabilistic selection. It is noted that where not all importance scores are positive, the importance scores may be converted into positive values which can in turn be converted into a probability distribution. Any suitable probability distribution can be employed such as a probability distribution function or probability distribution table.

As mentioned above, content selector 118 may employ an iterative selection process for the text units. In each iteration, content selector 118 can probabilistically select at least one text unit to include in the summary Selected text unit(s) can be removed from the group of text units eligible to be selected in future iteration in the summary. This can include, for example, resampling from the probability distribution when a sampled value corresponds to a previously selected text unit. As another example, the probability distribution can be modified or updated to remove values or outcomes that correspond to a previously selected text unit. In some cases, text unit analyzer 116 updates the probability distribution by generating a new probability distribution from the remaining text units and using the new probability distribution in to select additional text units.

When probabilistic selection of text units is employed for each given summary, the summaries that are generated are more likely to be diverse from one another in terms of concepts and/or other criteria quantified by the importance metric. However, not all implementations of the present disclosure require such probabilistic selection of text units. For example, as mentioned previously, content selector 118 could select the highest importance score of the remaining text units that have not been selected to include in the summary.

In some implementations, where content selector 118 employs an iterative selection process for the text units, the importance score of at least one of the remaining text unit is evaluated based on the text unit(s) selected in a given iteration. For example, text unit analyzer 116 can update or modify the importance scores based on a selected text unit. This can include reducing importance scores for remaining text units based on determining a level of similarity between the remaining text units and the selected text unit. By reducing the importance scores, the weighting of the importance scores is modified, which reduces the probability of each corresponding text unit being selected for the summary.

For example, in a deterministic approach to text unit selection, the text units are less likely to, for example, have the highest importance score. As another example, using a probability distribution to select text units, the text units are less likely to correspond to sampled values. This approach can be used to promote diversity within a given summary in terms of concepts and/or other criteria quantified by the importance metric.

Text unit analyzer 116 can reduce an importance score of a remaining text unit based on a level of similarity text unit analyzer 116 determines and/or identifies between the remaining text and the selected text unit. Importance scores of highly dissimilar remaining text units may not receive any discount, or reduction. In some cases, text unit analyzer 116 evaluates similarity with respect to concepts covered by the text units, such as the same concepts or topics that may be analyzed by the importance metric.

In some implementations, text unit analyzer 116 generates a graph $G=(V, E, W)$ where each text unit is represented as a corresponding node $v \in V$ in the graph and edges $e \in E$ between the nodes are based on the level of similarity text unit analyzer 116 determines for each text unit. Determining a level of similarity can comprise determining a cosine similarity score between the text units. Each node can be assigned a base importance score $r_i$, which can initially represent the inherent value of including the node in a summary, such as being based on representativeness of the text unit (e.g., the number of meaning entities identified in the text unit). A weight adjusted importance score $G_{V_i}$ of including a text unit $v_i$ in a summary can be the weighted summation of the current individual based importance scores of all the neighbors of text unit $v_i$ in the graph and can be given by:

$$G_{V_i}^l = \Sigma_{V_j \in N_i}(r_j^l w_{ij})$$

Where $N_i$ is the set of neighboring text units of text unit $v_i$. In another approach, the weight adjusted importance score $G_{V_i}$ is further adjusted for each text unit $v_i$ based on the cost of text unit $v_i$ that is applied to the budget, resulting in a weight and cost adjusted importance score. For example, the weight adjusted importance score $G_{V_i}$ can be divided by the cost of text unit $v_i$. Thus, a text unit that has a higher weight adjusted importance score $G_{V_i}$ than another text unit may have a lower weight and cost adjusted importance score than the other text unit due to its cost. The cost adjusted importance scores can be used to select from the text units.

Content selector 118 can then use the weighted importance scores to select from the text units for a summary, such as by selecting the text unit having the highest weighted importance score, or converting the weighted importance scores into a probability distribution and sampling from the probability distribution. Text unit analyzer 116 reduces the based importance score of the neighbor nodes, $v_j$ of the selected text unit. The reduced base importance scores can be given by:

$$r_j^l = \Sigma_{V_j \in N_i}(r_j^{l-1}(1-w_{ij}))$$

Thus, the base importance score of each neighbor of a selected text unit can be updated by multiplying the amount of its uncaptured similarity with the selected text unit, which promotes diversity in the summary.

In implementations where text units are probabilistically selected in generating multiple summaries, the summaries have an increased likelihood of being diverse from one another in terms of content. However, regardless of whether the selection is probabilistic or deterministic, in some cases, the likelihood of generating diverse summaries is further enhanced by modifying a weighting of importance scores of text units selected for one summary to reduce a probability of the text units being selected for another summary In one approach, the based importance score of each text unit that has been selected in a summary is multiplied by a damping factor when utilized to generate another summary. As an example, assuming an importance score may assume a value of 0 through 1, a suitable damping factor could be 0.7.

Using this approach, the text units are less likely to be selected for the other summary, but still have a chance of being selected. For example, using a probability distribution, the probability of selecting text units that have a damping factor applied is reduced. In deterministic approaches, those text units are also less likely to be selected, for example by being less likely to have the highest weighted importance score. In another approach, the weighting of importance scores is modified by adjusting a probability distribution formed from the first importance scores. For example, the probability distribution employed to generate one summary can be adjusted to reduce the probability that the text units are selected in the other summary.

The weighting of importance scores for text units can be modified for each summary that is generated from a text composition. For example, each time a text unit is selected for a given summary, the importance score can be reduced. Thus, when a given text unit is selected for a first summary, the weighting of its importance score can be reduced in selecting text units for a second summary. Furthermore, in selecting text units for a second summary, the weighting of the importance score of the given text unit can be further reduced if it has been selected to be included in the second summary Using a damping factor of 0.7 for each time the text unit is selected, and assuming the base importance score was initially 1 for the first summary, the weighting of the importance score may be reduced to 0.7 for generating the second summary, and 0.49 for generating the third summary. It will be appreciated that the weighting need not be adjusted by the same factor each time the text unit is selected for a summary. Furthermore, the weighting for different text units may be different, such as by using a different damping factor for different text units.

As mentioned above, summary analyzer 120 evaluates generated summaries with respect to at least one criteria to determine how to provide the summaries to the user and/or which summaries to provide to the user. For example, summary analyzer 120 can analyzing text of each summary, determine evaluation scores of each summary based on the analysis of the text, and rank the summaries by the evaluation scores. In some cases, the summaries that are displayed to the user are based on the evaluation scores and/or the ranking of the summaries. For example, the summaries may be displayed in order of their ranking (e.g., on user device 102*a*, optionally in application 110).

As another example, only summaries that exceed a threshold evaluation score may be provided to and/or displayed a user device. Furthermore, at least one summary may be discarded based on failing to exceed the threshold evaluation score. When a summary is discarded, optionally content selector 118 may select text units for an additional summary in place of the discarded summary. For example, summaries may be generated until a number of summaries requested by the user to be generated exceed the threshold evaluation score.

In some implementations, criteria factored into evaluation scores are assigned a weighting, representing the significance of the criteria. The weighting can be machined learned using at least one machine learning model. The machine learning models(s) can be updated based on user feedback and may be personalized to the user requesting the summaries. For example, interface engine 112 can receive a selection, by the user, of a given summary from a set of summaries presented on user device 102a in response to the request to generate the summaries. Feedback analyzer 122 can analyze the selection and update the machine learning model based on the selection. For example, feedback analyzer 122 may analyze the selected summary with respect to various criteria and update corresponding machine learning models based on the analysis. Thus, content management system 106 may learn the relative importance of various criteria, or features, of summaries to users in general and/or particular users.

The machine learned information can be applied to future rankings of summaries generated in response to requests. In addition, or instead, the machine learning models can be applied to importance scores in order to adjust the weightings of base importance scores of text units. As an example, adjustments to weightings of text units when generating a summary based on selecting a text unit for the summary can be machine learned based on the criteria. As another example, adjustments to weightings of text units for generating one summary based on including the text units in one or more other summaries can be machine learned based on the criteria.

In some cases, feedback analyzer 122 learns criteria corresponding to which topics a user prefers in summaries using a machine learning model and boost text units corresponding to the preferred topics. As another example, the criteria could be a preferred writing style of the user (e.g., a business style, a conversational style, a particular style of sentence structure, a use of clichés, a use of tense, a level of sophistication, a style directed to a particular audience, or demographic, or other features of a text unit that can be evaluated by text unit analyzer 116).

FIG. 2B shows an example of a display of summaries provided to a user device in response to a request to generate summaries of a text composition. In particular, display 200B can correspond to summaries provide in response to a request from a user provided using user interface 200A of FIG. 2A. Display 200B can be presented on, for example, user device 102a in application 110 or another application. Display 200B includes summaries 240a, 240b, and 240c of text composition 242, any of which can correspond to summary 140 comprising text units 152 of FIG. 1. Three summaries have been generated and provided to user device 102a based on summarization preference 270 specifying three summaries for the request. Furthermore, each summary has at most one-hundred words based on summarization preference 272 specifying a budget of one-hundred words per summary for the request. Optionally, each of summaries 240a, 240b, and 240c may be editable in display 200B. For example, display 200B may include word processing functionality. In some implementations, each summary is provided in a respective editable text box.

In some cases, the order of summaries 240a, 240b, and 240c is based on their rankings. For example, the summaries may be displayed from highest ranking at the top of display 200B to lowest ranking at the bottom of display 200B. In addition, or instead, the summaries may be displayed with their evaluation scores, which can be broken down by any of the various criteria that may be used to evaluate the summaries. This can include displayed scores or other indicates based on the evaluation scores, such as using a color code for ranges of scores.

Optionally, the user can use display 200B to select one or more of the displayed summaries. In some cases, selecting a summary comprises the user assigning the summary to as a variant text composition of the summarized text composition. For example the summarized text can be assigned as variant text composition 148 of master text composition 142. The assignment can, for example, create a new variant content fragment for the summarized text or overwrite an existing variant text composition of a variant content fragment. The assigned summarized text can optionally include any edits or modifications made to the text by the user. In some cases, feedback analyzer 122 evaluates at least one of the changes made by the user and applies the evaluation to at least one machine learning mode, as described above. In some respects, the evaluation can comprise comparing the changed text to the text selected by content selector 118.

Figure 3:
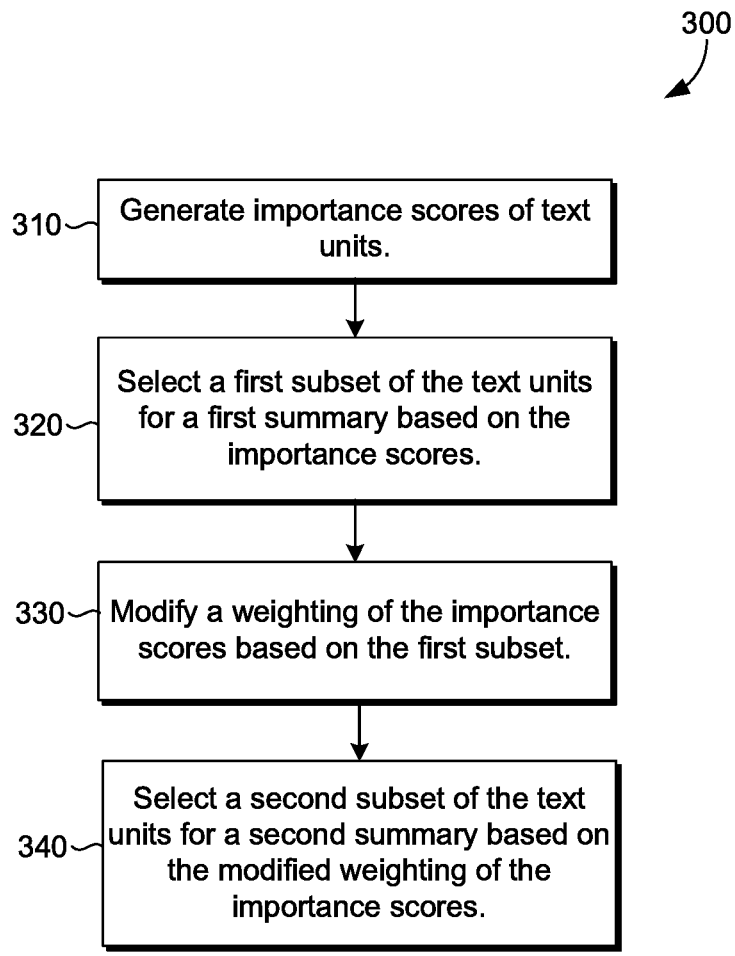
FIG. 3 is a flow diagram showing a method for generating summaries of text compositions in accordance with embodiments of the present disclosure.

Referring now to FIG. 3, a flow diagram is provided showing one embodiment of a method 300 for generating multiple summaries of text compositions. At block 310, method 300 includes generating importance scores of text units. For example, text unit analyzer 116 can generate importance scores 132 of text units of master text composition 142. The text units can be identified and extracted from master text composition 142 by text processor 114. The importance scores correspond to an importance metric. As an example, each text unit may correspond to one of the sentences of master text composition 242 of FIG. 2A.

At block 320, method 300 includes selecting a first subset of the text units for a first summary based on the importance scores. For example, importance scores 132 can be used to probabilistically and/or deterministically select text units to include in a summary corresponding to summary 240a of FIG. 2B. In some cases the text units of the first subset are selected iteratively, such as has been described above. Furthermore, the first subset of text units can encompass the first summary.

At block 330, method 300 includes modifying a weighting of the importance scores based on the first subset. For example, text unit analyzer 116 can modifying the weighting of importance scores 132 to reduce a probability of each given text unit of the text units corresponding to the text shown with respect to summary 240a of FIG. 2B from being selected to be included in summary 240b. This can include initializing the iterative selection of text units for summary 240b with importance scores of each text unit selected for summary 240a as adjusted by a damping factor, while utilizing the unmodified values for the remaining text units. As another example, a probability distribution used to initially select a text unit for summary 240a can be modified to reduce the probability of each given text unit of the text units corresponding to the text shown with respect to summary 240a from being selected to be included in summary 240b.

At block 340, method 300 includes selecting a second subset of the text units for a second summary based on the modified weighting of the importance scores. For example, content selector 118 can select each text units corresponding to the text of summary 240b shown in FIG. 2B to incorporate summary 240b based on the modified weighting of importance scores 132. Content selector 118 can utilize a similar or different approach to selection of text units, but typically employs the same selection metric used to select the text units for the first summary.

Figure 4:
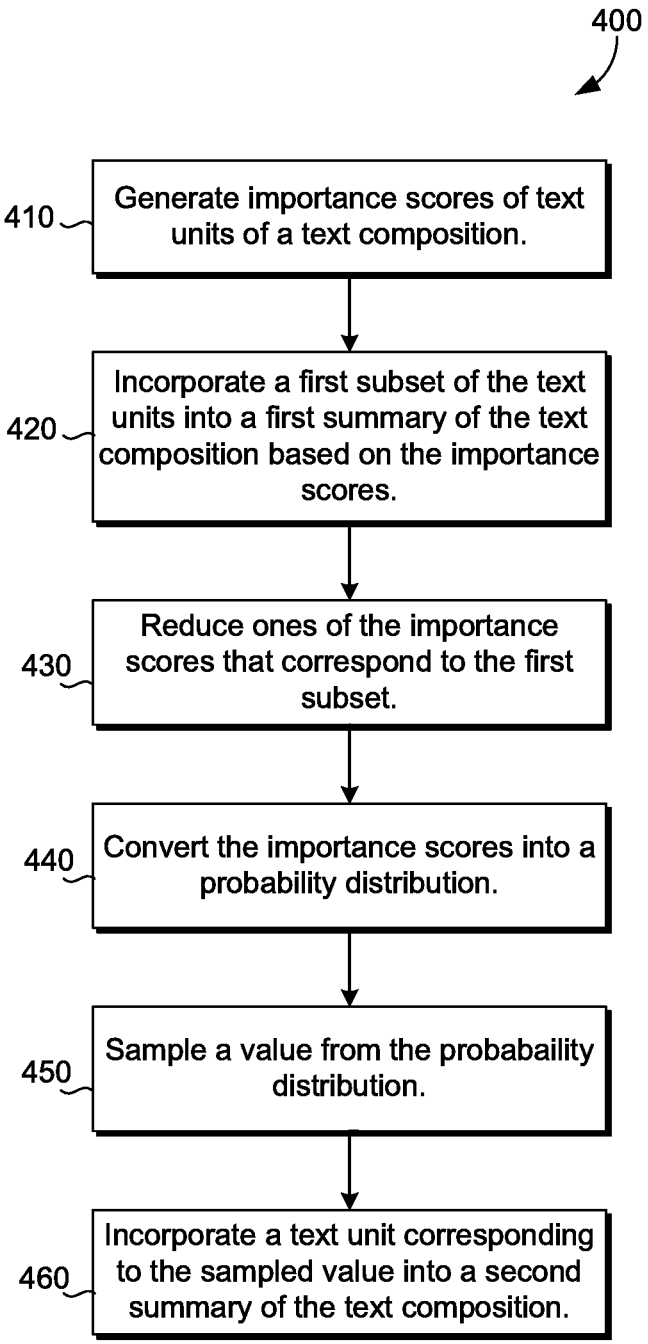
FIG. 4 is a flow diagram showing a method for generating summaries of text compositions in accordance with embodiments of the present disclosure.

Referring now to FIG. 4, a flow diagram is provided showing one embodiment of a method 400 for generating summaries of text compositions. At block 410, method 400 includes generating importance scores of text units of a text composition. For example, text unit analyzer 116 can generate importance scores 132 of text units of master text composition 142. The text units can be identified and extracted from master text composition 142 by text processor 114. The importance scores correspond to an importance metric. As an example, each text unit may correspond to one of the sentences of master text composition 242 of FIG. 2A.

At block 420, method 400 includes incorporating a first subset of the text units into a first summary of the text composition based on the importance scores. For example, content selector 118 can probabilistically and/or deterministically select text units to include in a summary corresponding to summary 240a of FIG. 2B based on importance scores 132. In some cases the text units of the first subset are selected iteratively, such as has been described above. Furthermore, the first subset of text units can encompass the first summary Content selector 118 can incorporate each of the selected text units into the first summary as shown in FIG. 2B.

At block 430, method 400 includes reducing ones of the importance scores that correspond to the first subset. For example, text unit analyzer 116 can reduce importance scores 132 by a damping factor for ones of the text units that were selected for summary 240a based on those text units being selected for summary 240a. The importance scores of the remaining text units may remain unmodified.

At block 440, method 400 includes converting the importance scores into a probability distribution. For example, text unit analyzer 116 can convert the importance scores converting comprising the reduced scores into a probability distribution.

At block 450, method 400 includes sampling a value from the probability distribution. For example, context selector 118 can sample a value from the probability distribution.

At block 460, method 400 includes incorporating a text units corresponding to the sampled value into a second summary of the text composition. For example, content selector 118 can incorporate a text unit that corresponds to the outcome of the probability distribution into summary 240b. The importance scores and/or probability distribution can be adjusted based on the sampled text unit and additional text units can be selected using the adjusted weightings of the importance scores. For example, the weightings may be adjusted for each iteration of an iterative selection of text units.

Figure 5:
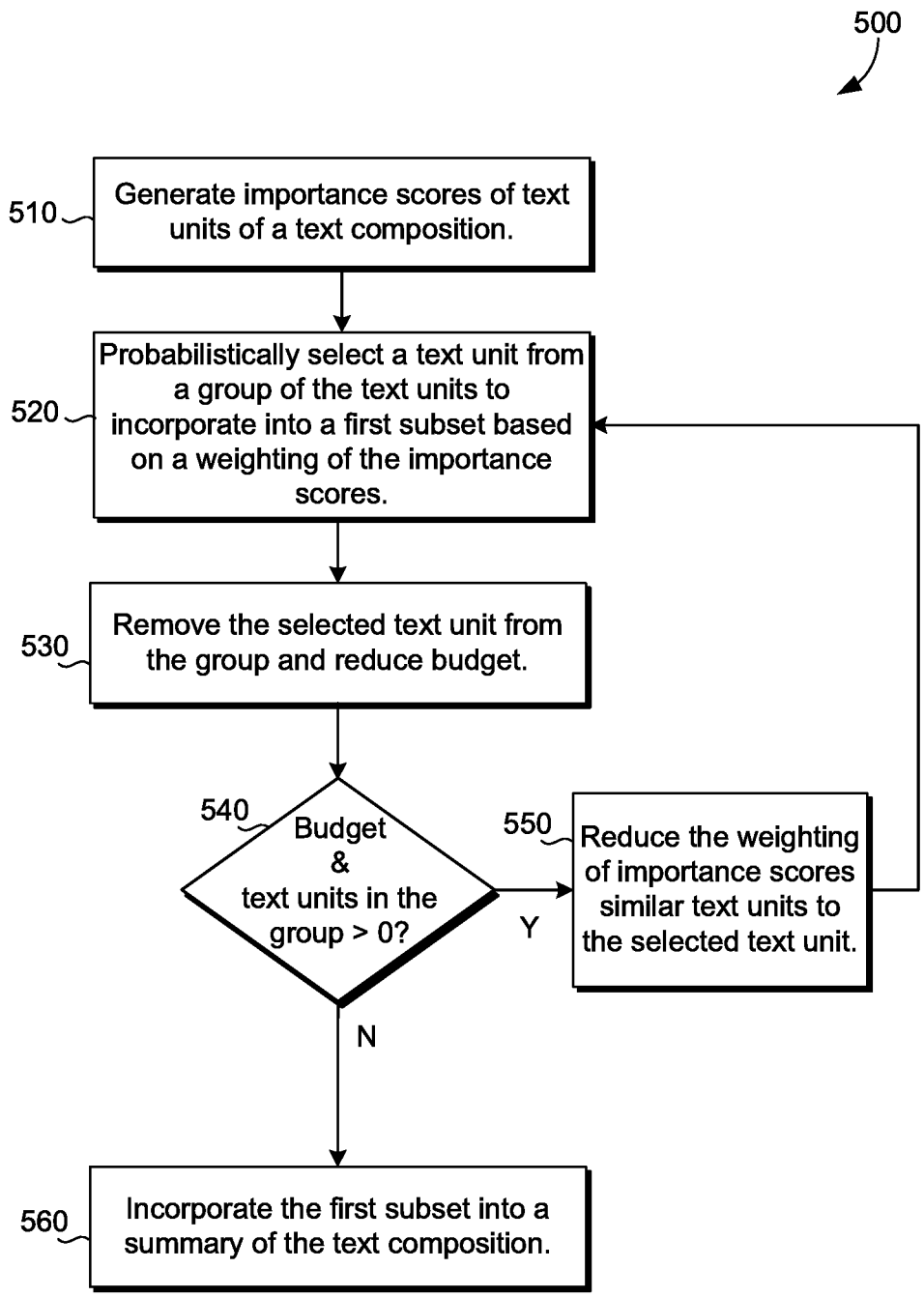
FIG. 5 is a flow diagram showing a method for generating summaries of text compositions in accordance with embodiments of the present disclosure.

Referring now to FIG. 5, a flow diagram is provided showing one embodiment of a method 500 for generating summaries of text compositions. Method 500 can be used, for example, to generate each summary in methods 300 and 400. At block 510, method 500 includes generating importance scores of text units of a text composition. For example, text unit analyzer 116 can generate importance scores 132 of text units of master text composition 142. The text units can be identified and extracted from master text composition 142 by text processor 114. The importance scores correspond to an importance metric. As an example, each text unit may correspond to one of the sentences of master text composition 242 of FIG. 2A.

At block 520, method 500 includes probabilistically selecting a text unit from a group of the text units to incorporate into a first subset based on a weighting of the importance scores. For example, text unit analyzer 116 can convert the importance scores of each text unit of master text composition 142 into a probability distribution and context selector 118 can sample a value corresponding to the text unit from the probability distribution. Context selector 118 can select the text unit based on the sampled value.

At block 530, method 500 includes removing the selected text unit from the group of the text units and reducing a budget of the summary. For example, the selected text unit can be a cost associated with being selected for the summary. Assuming, for example, that the first sentence of summary 240a shown in FIG. 2B corresponds to the selected text unit, the cost may be, for example, seven because the text unit comprises seven words. As noted above, budgets can cost can be measured in any suitable way. In the present example, it can be assumed that the budget is one-hundred words, as indicated in FIG. 2A.

At block 540, method 500 includes determining whether additional budget remains and whether additional text units are available to select from for the summary. For example, content selector 118 can determine whether the budget is greater than zero. Content selector 118 can also determine whether any text units remain to be selected from for the summary. This can also include determining whether any of the remaining text units can fit within the remaining budget for the summary.

Where the various possible conditions of block 540 are satisfied, method 500 proceeds to block 550. At block 550, method 500 includes reducing the weighting of importance scores for similar text units to the selected text unit. For example, text unit analyzer 116 can reduce the importance scores for text units text unit analyzer 116 determines are related to the selected text unit. Using a graph based approach to text unit selection, the neighbors of the selected text unit can have their importance scores reduced. The probability distribution used at block 520 can be updated with a new probability distribution generated using the reduced importance scores for a subsequent instance of block 520. As another example, the probability distribution used at block 520 could be modified directly to reduce the weighting of the importance scores for the subsequent instance.

Method 500 can repeat until at least one of the conditions analyzed at block 540 is not met. Where any of the various possible conditions of block 540 are not satisfied, method 500 proceeds to block 560. At block 560, method 500 includes incorporating the first subset of text units into a summary of the text composition. For example, the selected text units can be incorporated into summary 240a, as shown in FIG. 2B. Subsequently another summary may be generated, such as summary 240b shown in FIG. 2B. Summary 240b may be generated using method 500 with the initial importance scores at block 510 being reduced for text units that have been selected for summary 240a. Subsequently a third summary may be generated, such as summary 240c shown in FIG. 2B. Summary 240c may be generated using method 500 with the initial importance scores at block 510 being reduced for text units that have been selected for summary 240a and summary 240b. In doing so, text unit analyzer 116 can reduce importance scores of text units based on the number of previous summaries each text unit has been selected for. As an example, the text unit corresponding to the sentence "Before we buy, build, or user, we ask, is it sustainable?" in FIG. 2B can have its importance score reduced for generating summary 240b, and further reduced for generating summary 240c (e.g., by applying a damping factor for each time the text unit is selected).

Figure 6:
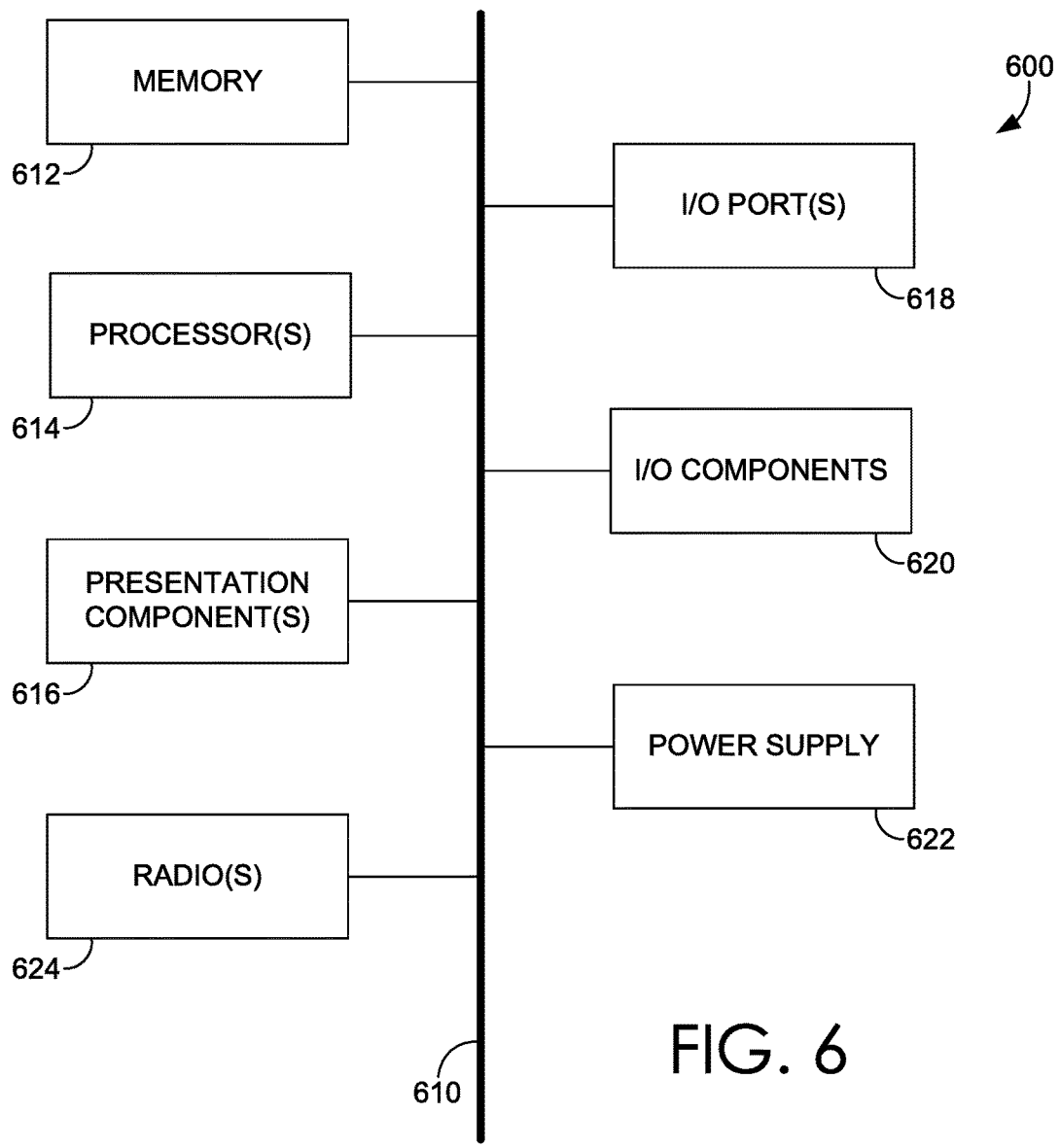
FIG. 6 is a block diagram of an exemplary computing environment suitable for use in implementations of the present disclosure.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. At least one computer storage media storing computer-useable instructions that, when used by the at least one computing device, cause the at least one computing device to perform a method comprising:
    receiving a request from a user to generate summaries of a text composition;
    dividing the text composition into text units, each text unit representing a respective sentence of the text composition;
    generating a set of importance scores of each of the text units, each importance score corresponding to an importance metric that quantifies a relative importance of including an associated text unit of the text units in the summaries of the text composition;
    selecting a first subset from the text units to include in a first summary of the summaries based on the importance scores;
    generating a set of updated importance scores of each of the text units by adjusting each importance score of the importance scores that corresponds to the first subset of text units to reduce the relative importance of the first subset of text units from the text units not included in the first subset of text units;
    converting the set of updated importance scores into a probability distribution that defines for each text unit, a respective probability that a value corresponding to the text unit is selected by sampling of the probability distribution, the respective probability corresponding to the importance score of the text unit in the set of updated importance scores;
    selecting a second subset from the text units to include in a second summary of the summaries, the second subset comprising a different plurality of the text units than the first subset, wherein a given text unit is selected based on the value selected by the sampling corresponding to the given text unit;

incorporating the given text unit into the second summary; and transmitting the first summary and the second summary to the user in response to the request.

2. The at least one computer storage media of claim 1, further comprising probabilistically selecting each text unit in the first subset of text units for the incorporating into the first summary based on the importance scores.

3. The at least one computer storage media of claim 1, wherein the method further comprises:

updating the probability distribution to remove the given text unit from potential outcomes of sampling the probability distribution; and after the removing, sampling the probability distribution to probabilistically select an additional text unit of the text units to incorporate into the second summary based on the sampling.

4. The at least one computer storage media of claim 1, wherein the method further comprises:

analyzing text of each summary of the summaries;

determining evaluation scores of each summary of the summaries based on the analyzing of the text of each summary;

ranking the summaries by the evaluation scores; and displaying the first summary and the second summary to the user based on the ranking of the summaries.

5. The at least one computer storage media of claim 1, wherein the importance metric quantifies for each text unit of the text units a level of representativeness of a concept in text of the text unit with respect to the text composition.

6. The at least one computer storage media of claim 1, wherein the importance metric quantifies for each text unit of the text units a level of diversity of a concept in text of the text unit with respect to concepts in text of text units selected to incorporate into the first summary.

7. A computer-implemented method comprising:

selecting a first subset of text units of a text composition to incorporate into a first summary of the text composition using a set of importance scores associated with each of the text units, the importance scores indicating, for each text unit of the text units, a relative importance of including the text unit in summaries of the text composition;

generating a set of updated importance scores by:

reducing the importance scores of each text unit in the first subset based on the text unit having been selected for the first subset; and maintaining the importance scores for the text units not included in the first subset;

converting the set of updated importance scores into a probability distribution that defines for each text unit, a respective probability that a value corresponding to the text unit is selected by sampling of the probability distribution, the respective probability corresponding to the importance score of the text unit in the set of updated importance scores;

selecting a second subset of text units to incorporate into a second summary of the text composition, the second subset comprising a different plurality of text units than the first subset, the selecting including a selected text unit from the text units based on the value selected by the sampling corresponding to the selected text unit; and providing at least one of the first summary and the second summary to a user device.

8. The computer-implemented method of claim 7, wherein the reducing the importance scores of each text unit in the first subset reduces the relative importance for a given text unit of the first subset with respect to the text units not included in the first subset of text units.

9. The computer-implemented method of claim 7, reducing the importance scores is by a damping factor.

10. The computer-implemented method of claim 7, wherein the selecting the first subset comprises:

converting the importance scores that quantify the relative importance for each of the text units into an initial probability distribution;

sampling a value from the initial probability distribution; and including a first text unit in the first subset based on the first text unit corresponding to the sampled value.

11. The computer-implemented method of claim 7, further comprising:

identifying delimiters between text corresponding to the text units in the text composition; and parsing the text composition into the text units based on the identified delimiters.

12. The computer-implemented method of claim 7, wherein the selecting the first subset is from a group of text units comprising the text units and comprises:

probabilistically selecting a first text unit from the group of text units to incorporate into the first summary based on the relative importance of the first text unit;

removing the first text unit from the group of text units; and after the removing, probabilistically selecting a second text unit from the group of text units to incorporate into the first summary based on the relative importance of the second text unit.

13. The computer-implemented method of claim 7, wherein the selecting the second subset is from a group of text units comprising the text units and the method further comprises:

determining similar text units in the group of text units to the selected text unit;

modifying the probability distribution to reduce probabilities of sampling values corresponding to the determined similar text units; and after the modifying, probabilistically selecting an additional text unit to incorporate into the second summary based on the sampling of the probability distribution.

14. The computer-implemented method of claim 7, wherein the providing the at least one of the first summary and the second summary to the user device is for presenting on the user device, and the method further comprises:

receiving a selection, by the user, of the first summary from a set of the summaries presented on the user device by the presenting;

in response to the selection, assigning the first summary to the text composition as a variant text composition.

15. The computer-implemented method of claim 7, further comprising:

analyzing text of each summary of the summaries;

determining evaluation scores of each summary of the summaries based on the analyzing of the text of the summary;

ranking the summaries by the evaluation scores; and displaying the first summary and the second summary to the user based on the ranking of the summaries.

16. The computer-implemented method of claim 7, wherein the providing the at least one of the first summary and the second summary to the user device is for presenting on the user device, and the method further comprises:
- ranking the summaries using a machine learning model, wherein the presenting is based on the ranking;
- receiving a selection, by the user, of the first summary from a set of the summaries presented on the user device by the presenting;
- updating the machine learning model based on the selection.

17. A computer-implemented system comprising:
- at least one processor; and
- computer storage media storing computer-useable instructions that, when executed by the at least one processor, cause the at least one processor to perform operations comprising:
- generating a set of importance scores of text units of a text composition, the importance scores corresponding to an importance metric;
- probabilistically selecting each text unit of a first subset of text units to incorporate into a first summary of the summaries based on sampling a first probability distribution having outcomes corresponding to the set of importance scores and the text units;
- modifying a weighting of the importance scores, of each given text unit in the first subset of text units, to generate a set of modified importance scores for each given text unit in the first subset of text units, the modifying to reduce a probability of each given text unit in the first subset of text units being selected for a second subset of the text units;
- probabilistically selecting the second subset of text units to incorporate into a second summary based on sampling a second probability distribution having outcomes corresponding to the set of updated importance scores and the text units; and
- providing at least one of the first summary and the second summary to a user device.

18. The computer-implemented system of claim 17, wherein the modifying the weighting comprises reducing each score of the importance scores that corresponds the first subset of text units.

19. The computer-implemented system of claim 17, wherein the modifying of the weighting comprises adjusting the first probability distribution formed from the importance scores to result in the second probability distribution.

20. The computer-implemented system of claim 17, wherein the probabilistically selecting the first subset comprises:
- converting the importance scores into the first probability distribution;
- performing the sampling of a value from the probability distribution; and
- including a first text unit in the first subset based on the first text unit corresponding to the sampled value.

* * * * *